United States Patent
Gresset et al.

(10) Patent No.: US 7,366,249 B2
(45) Date of Patent: Apr. 29, 2008

(54) METHOD FOR TRANSMITTING OPTIMALLY INTERLEAVED DATA IN A MIMO TELECOMMUNICATION SYSTEM

(75) Inventors: Nicolas Gresset, Rennes Cedex 7 (FR); Loic Brunel, Rennes Cedex 7 (FR); Joseph Boutros, Paris (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 643 days.

(21) Appl. No.: 10/926,086

(22) Filed: Aug. 26, 2004

(65) Prior Publication Data

US 2005/0078764 A1 Apr. 14, 2005

(30) Foreign Application Priority Data

Aug. 29, 2003 (EP) .................. 03292130

(51) Int. Cl.
*H04B 7/02* (2006.01)
*H04B 7/06* (2006.01)
*H04B 1/02* (2006.01)

(52) U.S. Cl. ................. 375/267; 375/299; 455/101
(58) Field of Classification Search ........... 375/260, 375/267, 295, 299; 370/208–210; 455/101, 455/132
See application file for complete search history.

(56) References Cited

U.S. PATENT DOCUMENTS

| 6,473,467 B1 * | 10/2002 | Wallace et al. .......... 375/267 |
| 2003/0128769 A1 | 7/2003 | Kim et al. |
| 2005/0152266 A1 * | 7/2005 | Hwang et al. .......... 370/210 |
| 2006/0203935 A1 * | 9/2006 | Li et al. ............ 375/299 |
| 2007/0041457 A1 * | 2/2007 | Kadous et al. .......... 375/260 |

FOREIGN PATENT DOCUMENTS

| EP | 1-511-212 A1 * | 3/2005 |
| EP | 1-770-892 A1 * | 4/2007 |

OTHER PUBLICATIONS

Andrea M. Tonello; "Space-Time Bit-Interleaved Coded Modulation over Frequency Selective Fading Channels with Iterative Decoding"; GLOBECOM'00. 2000 IEEE Global Telecommunications Conference. San Francisco, CA, Nov. 27-Dec. 1, 2000, IEEE Global Telecommunications Conference, New York, NY: IEEE, US; vol. 3 of 3; Nov. 27, 2000; pp. 1616-1620; XP002180266 ISBN: 0-7803-6452-X.

* cited by examiner

*Primary Examiner*—Tesfaldet Bocure
(74) *Attorney, Agent, or Firm*—Oblon, Spivak, McClelland, Maier & Neustadt, P.C.

(57) ABSTRACT

The present invention relates to a method for transmitting data including a bit interleaving step for permutating encoded data bits Tb before their transmission in the form of modulation symbols over Nt transmitting antennas. According to the invention, the bit interleaving step involves bit demultiplexing DMXS for extracting bit sequences Bsj (for j=0 to Nt) from the encoded data bits Tb, sequence interleaving SRIS for permutating the bits of each sequence Bsj (for j=0 to Nt), sequence storing and segmenting SQSS for dividing each interleaved sequence Isqj (for j=0 to Nt) into successive segments Psgj, and segment shifting SGS for applying circular shifts to simultaneous different segments Psgj (for j=1 to Nt). The invention enables to ensure that consecutive encoded bits see a maximum number of different communication channel states, and thus favours data diversity.

11 Claims, 3 Drawing Sheets

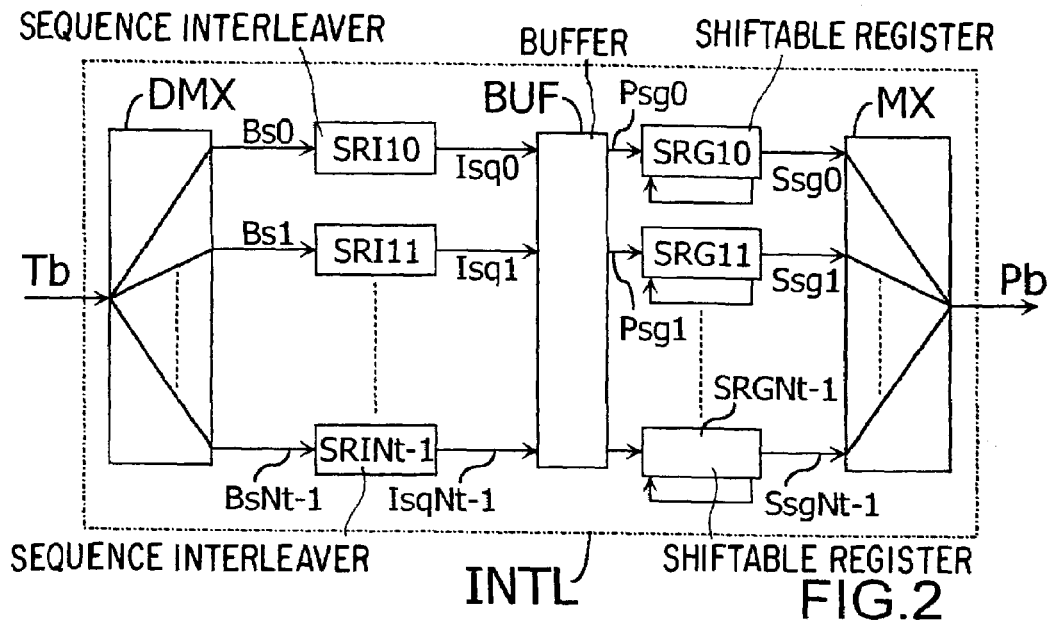
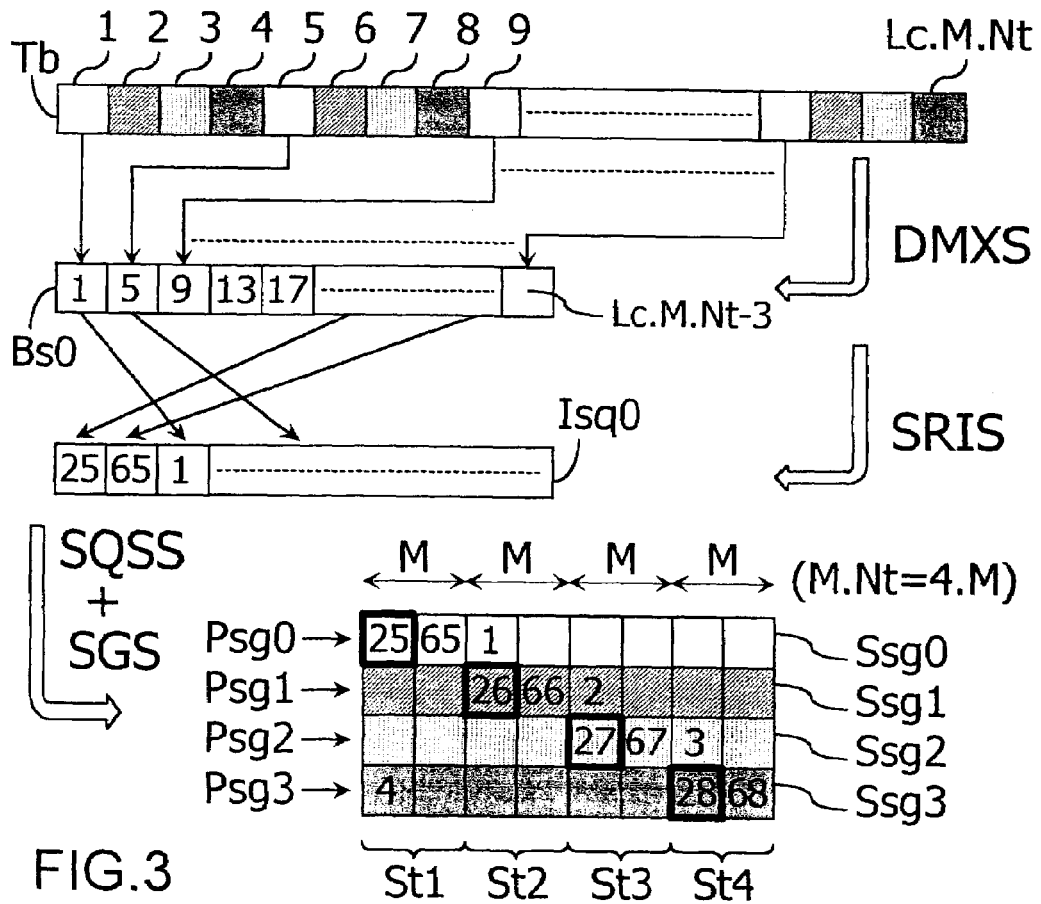

METHOD FOR TRANSMITTING OPTIMALLY INTERLEAVED DATA IN A MIMO TELECOMMUNICATION SYSTEM

BACKGROUND OF THE INVENTION

Field of the Invention

The present invention relates to a method for transmitting data in a telecommunication system including at least one transmitter provided with Nt transmitting antennas and at least one receiver provided with at least one receiving antenna, which method includes a bit encoding step for generating encoded data bits, a bit interleaving step for permutating said encoded data bits, and a modulation step for producing symbols representative of the permutated bits, each symbol featuring a plurality of components of M bits each, and being intended to be transmitted over communication channels established between the transmitting and receiving antennas.

Telecommunication systems in which a plurality of antennas are used at a receiver end and/or at a transmitter end of a wireless link are called Multiple Input Multiple Output systems (further referred to as MIMO systems). MIMO systems have been shown to offer large transmission capacities compared to those offered by single antenna systems. In particular, MIMO capacity increases linearly with the number of transmitting or receiving antennas, whichever the smallest, for a given Signal-to-Noise Ratio and under favourable uncorrelated channel conditions. MIMO techniques are thus likely to be used in future wireless systems intended to provide large spectral efficiencies or, alternatively, reduce the transmitting power required for obtaining a spectral efficiency equivalent to that which is obtained in current telecommunication systems. Such MIMO techniques will very likely be combined with multi-carrier modulation techniques like OFDM (standing for Orthogonal Frequency Division Multiplex) and MC-CDMA (standing for Multi-Carrier-Code Division Multiple Access) techniques, whose use in future wireless systems is also considered.

A particular type of MIMO systems makes use of a Bit Interleaved Coded Modulation technique, further referred to as BICM, according to which the transmitter includes a channel encoder intended to apply an encoding, e.g. by means of a convolutional code or of a turbo code, to uncoded data bits, and to provide an encoded bit stream to an interleaver. This interleaver will then deliver permutated bits, which are to be divided into word sequences intended to be transformed into a series of coded symbols featuring each a plurality of components, the components of a same symbol being intended to be transmitted during a same time interval, called symbol period, by respective transmitting antennas.

Transmitted symbols are to be decoded on the receiver end, which is usually performed in MIMO systems of the BICM type by means of an iterative space-time decoder, which decoder is intended to produce estimates of coded bits constituting the transmitted symbols. The spatial diversity induced by the use of multiple transmitting and receiving antennas eases such a decoding, since this diversity provides a larger amount of information than that which would be provided by a single signal transmitted through a single communication channel.

BRIEF SUMMARY OF THE INVENTION

The inventors have observed that increasing the diversity of input data provided to a space-time decoder enables said decoder to converge towards more reliable estimates of the coded bits on the basis of which said data has been generated. This may be construed as obtaining better decoding performance by feeding the decoder with data having a higher quality, i.e. a richer content.

The highest diversity which may be perceived at the receiver end of a MIMO system is determined, on the one hand, by a space-related property of the system, i.e. by the number of receiving antennas, and, on the other hand by time-related properties of the system, i.e. the number of different communication channel states occurring during transmission of a given codeword or a minimum code distance. The minimum code distance is defined by a threshold number of bit differences between two codewords beneath which threshold said codewords will be considered identical.

The maximum obtainable diversity may thus be expressed in the form of a product between the number of receiving antennas and the lowest value of the above-described time-related parameters.

Current interleaving techniques do not enable to use to its full extent the diversity theoretically offered by MIMO systems, since consecutive bit sequences delivered by known interleavers and intended to be transmitted during a same symbol period usually include bits which were adjacent to each other within the original encoded bit stream, which reduces the time-related diversity of the data sent to the receiver and in turn limits the performance of the space-time decoder included in this receiver.

The invention aims at solving the aforementioned problem, by providing a method for transmitting data in a MIMO system, which method involves an interleaving scheme enabling to use to its full extent the diversity theoretically offered by such a system, with respect to both space and time, of the data intended to be decoded at the receiver end of this system.

Indeed, a method according to the opening paragraph is characterized according to the invention in that the bit interleaving step includes:

a bit demultiplexing sub-step for extracting from the encoded data bits a plurality of bit sequences, each sequence being intended to be transmitted by one of the transmitting antennas, a sequence interleaving sub-step for permutating the bits of each bit sequence produced by the demultiplexing sub-step, a sequence storing and segmenting sub-step for memorizing all permutated sequences produced by the sequence interleaving sub-step and dividing said sequences into segments having each a predermined length, and a segment shifting sub-step for simultaneously applying circular shifts to segments of different permutated sequences produced by the sequence storing and segmenting sub-step, so that each shifted segment ends up shifted by at least M bits with respect to all other simultaneously shifted segments.

The invention enables to compound the spatial diversity obtained by the use of multiple communication channels established between the transmitting and receiving antennas with a high diversity with respect to time of the data transmitted through said channels.

The invention ensures, by virtue of the demultiplexing sub-step, an essentially homogeneous distribution of the encoded data bits over the different transmitting antennas, which ensures that successive bits will be transmitted over different channels, and thus favours data diversity as perceived at the receiver end of a telecommunication system in which a method according to the invention is used. Furthermore, the shifting sub-step carried out in the method according to the invention enables to place consecutive encoded bits over different symbol periods.

According to a first variant of the invention, the bit demultiplexing sub-step is intended to produce Nt different bit sequences, each sequence being intended to be transmitted by one transmitting antenna over Lc symbol periods.

This first variant of the invention is particularly well-suited to situations where physical properties of the communication channels between the transmitting and the receiving antennas are ergodic, i.e. expected to vary from one symbol period to another, such consecutive encoded bits then seeing a maximum number of different channel states.

This first variant is also particularly well-suited to opposite situations where physical properties of the communication channels between the transmitting and the receving antennas are essentially invariant, the fact that consecutive encoded bits are placed over different symbol periods then preventing such consecutive bits to interfere with each other within the communication channels and thus also favours data diversity. Such a de-correllation of consecutive uncoded bits will provide similar advantages for ergodic communication channels.

According to a second variant of the invention, particularly well-suited to situations where the communication channels are expected to feature Nc successive sets of physical properties during Lc successive symbol periods, the bit demultiplexing sub-step is intended to produce Nt.Nc different bit sequences, each sequence being intended to be transmitted by one transmitting antenna over Lc/Nc symbol periods.

Communication channels which are expected to successively feature different sets of communication conditions over Lc successive symbol periods are called block-fading channels. Such block-fading channels are essentially invariant for the duration of each set of communication conditions, which duration may thus be called an invariance period lasting Lc/Nc symbol periods. Thanks to this second variant of the invention, each given sequence will be sent over a given transmitting antenna during time slots which will be specific to said given sequence. This ensures that consecutive encoded bits will see a maximum number of different channel states and thus favours data diversity.

The segment shifting sub-step may be carried out by various means. According to a particularly advantageous embodiment of the invention, one of the segments of a given permutated sequence produced by the interleaving sub-step remains unchanged during the segment shifting sub-step, corresponding segments of each jth other permutated sequence being then simultaneously shifted by j.M bits.

This embodiment requires a limited number of sequence-shiftings while producing the above-mentioned advantages in terms of diversity, and is thus remarkable for its efficiency.

According to a preferred embodiment of the above described method, the sequence interleaving sub-step is carried out in such a way that Li successive encoded bits end up included in Li different segments after execution of the sequence interleaving sub-step.

Such a preferred embodiment of the invention enables optimal de-correlation of successive uncoded bits, which might otherwise stay linked together in cases where the bit encoding technique makes use of a convolutional code, according to which technique a same uncoded information bit is involved in the generation of L.n successive encoded bits, n being the number of encoded bits delivered by a convolutional channel encoder when said encoder is fed with a given number k of successive uncoded bits and L being a code constraint length. The inventors have observed that the use of such a variant of the invention may enable an essentially homogeneous distribution on all transmitting antennas and a mapping on different symbol periods of (Li−1).Nt+1 consecutive encoded bits if each segment has a length equal to M.Nt, the number (Li−1).Nt+1 being greater than or equal to L.n provided Li is properly chosen. Furthermore, this variant of the invention may be implemented at a relatively low cost by means of a plurality of identical and easily built interleaving modules.

According to one of its hardware-oriented aspects, the invention also relates to a telecommunication system including at least one transmitter provided with Nt transmitting antennas and at least one receiver provided with at least one receiving antenna, which transmitter includes bit encoding means for generating encoded data bits, bit interleaving means for permutating said encoded data bits, and modulation means for producing symbols representative of the permutated bits, each symbol featuring a plurality of components of M bits each, and being intended to be transmitted over communication channels established between the transmitting and receiving antennas, system characterized in that the bit interleaving means include:
  bit demultiplexing means for extracting from the encoded data bits a plurality of bit sequences, each sequence being intended to be transmitted by one of the transmitting antennas,
  sequence interleaving means for permutating the bits of each bit sequence produced by the demultiplexing means, and
  sequence storing and segmenting means for memorizing all permutated sequences produced by the sequence interleaving means and dividing said sequences into segments having each a predermined length, and
  segment shifting means for simultaneously applying circular shifts to segments of different permutated sequences produced by the sequence storing and segmenting means, so that each shifted segment ends up shifted by at least M bits with respect to all other simultaneously shifted segments.

According to a first variant of such a telecommunication system, particularly well-suited to situations where the communication channels are ergodic, or, conversely, essentially invariant, the bit demultiplexing means will be constructed so as to produce Nt different bit sequences, each sequence being intended to be transmitted by one transmitting antenna over Lc symbol periods.

According to a second variant of such a telecommunication system, particularly well-suited to situations where the communication channels are expected to feature Nc successive sets of physical properties during Lc successive symbol periods, the bit demultiplexing means will be constructed so as to produce Nt.Nc different bit sequences, each sequence being intended to be transmitted by one transmitting antenna over Lc/Nc symbol periods.

In a specific embodiment of such a telecommunication system, the segment shifting means are intended to leave one of the segments of a given permutated sequences produced by the interleaving sub-step unchanged, while simultaneously applying to corresponding segments of each jth other permutated sequence a circular shift of j.M bits.

According to a preferred embodiment of the telecommunication system described above, the sequence interleaving means include at least one interleaver intended to dispatch Li successive encoded bits into Li different segments delivered by said sequence interleaving means According to another of its hardware-related aspects, the invention also relates to a communication device provided with a plurality of transmitting antennas, which transmitter includes bit encoding means for generating encoded data bits, bit interleaving means for permutating said encoded data bits, and modulation means for producing symbols representative of the permutated bits, each symbol featuring a plurality of components of M bits each, and being intended to be transmitted over communication channels established between the transmitting and receiving antennas, device characterized in that the bit interleaving means include:
bit demultiplexing means for extracting from the encoded data bits a plurality of bit sequences, each sequence being intended to be transmitted by one of the transmitting antennas,
sequence interleaving means for permutating the bits of each bit sequence produced by the demultiplexing means, and
sequence storing and segmenting means for memorizing all permutated sequences produced by the sequence interleaving means and dividing said sequences into segments having each a predermined length, and
segment shifting means for simultaneously applying circular shifts to segments of different permutated sequences produced by the sequence storing and segmenting means, so that each shifted segment ends up shifted by at least M bits with respect to all other simultaneously shifted segments.

BRIEF DESCRIPTION OF THE SEVERAL VIEW OF THE DRAWINGS

The characteristics of the invention mentioned above, as well as others, will emerge more clearly from a reading of the following description given in relation to the accompanying figures, amongst which:

FIG. 2 is a block diagram showing an interleaver comprised in a transmitter included in a MIMO telecommunication system according to a first variant of the invention;

FIG. 3 is a diagram showing how such an interleaver operates; and

DETAILED DESCRIPTION OF THE INVENTION

Figure 1:
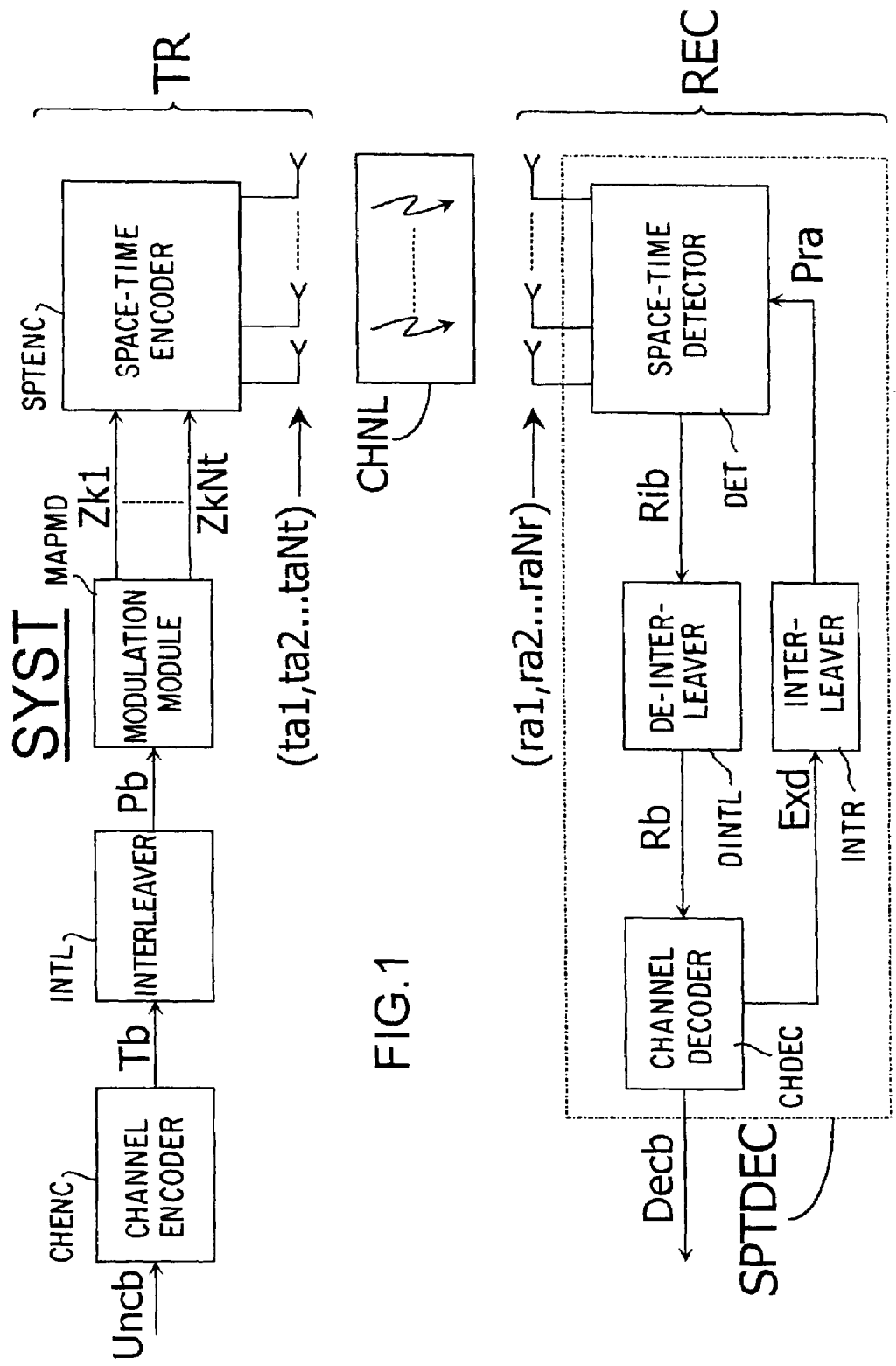
FIG. 1 is a block diagram showing a highly simplified MIMO telecommunication system.

FIG. 1 diagrammatically shows a telecommunication system including at least one transmitter TR and one receiver REC, intended to exchange signals through multiple communication channels CHNL established between Nt transmitting and Nr receiving antennas (ta1,ta2 . . . taNt) and (ra1,ra2 . . . raNr), respectively.

The transmitter TR shown in the example depicted here includes a channel encoder CHENC intended to apply an encoding, e.g. by means of a convolutional code or of a turbo code, to uncoded data bits Uncb, and to provide a binary stream of encoded data bits Tb to be transmitted. The transmitter TR includes interleaving means INTL intended to generate permutated bits Pb, such an interleaving being useful for a later processing on the receiver side, since it will allow to obtain uncorrelated data. The permutated bits Pb are then divided into sequences of M.Nt bits each, which bit sequences are then mapped, i.e. transformed into a series of coded symbols Zk by a mapping and modulation module MAPMD, each symbol Zk thus corresponding to Nt.M successive bits. Successive symbols Zk are then fed to a space-time encoder SPTENC, which performs a processing of said symbols before their transmission.

In the known state of the art, each symbol Zk thus features Nt components Zkj (for j=1 to Nt) of M bits each and intended to be transmitted by respective transmitting antennas taj (for j=1 to Nt) during a same symbol period.

The receiver REC shown in the example depicted here includes a space-time decoder SPTDEC intended to produce decoded data bits Decb which should ultimately correspond to the originally uncoded data bits Uncb. This space-time decoder SPTDEC includes a space-time detector DET intended to process data carried by signals received by means of the receiving antennas (ra1,ra2 . . . raNr), and to produce likelihood values Rib related to estimates of the transmitted permutated bits Pb, which likelihood values are intended to be de-interleaved by a de-interleaver DINTL which is to output soft likelihood values Rb related to estimates of bits included in the binary stream of encoded data bits Tb. A bit decoder included in the receiver REC, further referred to as channel decoder CHDEC, is intended to generate the decoded data bits Decb on the basis of said likelihood values Rb.

According to a loop structure commonly used in the art, the space-time detector DET will make use of a priori information Pra generated in the course of previous decoding steps, and issued in the form of extrinsic information Exd by the channel decoder CHDEC through interleaving means INTR, which interleaving means are identical to the interleaving means INTL included in the transmitter TR.

The inventors have observed that increasing the diversity of the data transmitted through the multiple communication channels CHNL established between the transmitting and receiving antennas (ta1,ta2 . . . taNt) and (ra1,ra2 . . . raNr) enables the space-time decoder SPTDEC to converge towards more reliable estimates of the coded bits on the basis of which said data has been generated. The inventors have thus aimed at maximizing the time-related diversity of the data transmitted over the transmitting antennas (ta1, ta2 . . . taNt).

FIG. 2 depicts bit interleaving means INTL which enable to obtain such an increased diversity. In this specific embodiment of the invention, the bit interleaving means INTL include:

bit demultiplexing means DMX for extracting from the encoded data bits Tb a plurality Nt of bit sequences Bs0 . . . BsNt−1, each sequence Bsi (for i=0 to Nt−1) corresponding to one of the Nt transmitting antennas described above, sequence interleaving means SRI0 . . . SRTNt−1 for permutating the bits of each bit sequence Bs0 . . . BsNt−1 produced by the demultiplexing means DMX, and sequence storing and segmenting means for memorizing all permutated sequences Isq0 ... IsqNt−1 produced by the sequence interleaving means SRI0 ... SRINt−1 and dividing each sequence Isqj into successive segments Psgj having each a predermined length of M.Nt in this embodiment of the invention, and segment shifting means for simultaneously applying circular shifts to segments Psg0 ... PsgNt−1 of different permutated sequences Isq0 ... IsqNt−1 produced by the sequence storing and segmenting means, so that each resulting shifted segment Ssgj (for j=0 to Nt−1) ends up shifted by at least M bits with respect to all other simultaneously shifted segments.

The embodiment described in this Figure relates to a first variant of the invention, according to which the bit demultiplexing means are intended to produce Nt different bit sequences, each sequence being intended to be transmitted by one transmitting antenna over Lc symbol periods.

This first variant of the invention is particularly well-suited to situations where physical properties of the communication channels between the transmitting and the receiving antennas are ergodic, i.e. expected to vary from one symbol period to another, such consecutive encoded bits then seeing a maximum number of different channel states.

This first variant is also particularly well-suited to opposite situations where physical properties of the communication channels between the transmitting and the receiving antennas are essentially invariant, the fact that consecutive encoded bits are placed over different symbol periods then preventing such consecutive bits to interfere with each other within the communication channels and thus also favours data diversity.

The sequence interleaving means Isq0 ... IsqNt−1 will preferrably be constituted by Nt identical interleaving modules arranged in parallel as shown here.

In this specific embodiment of the invention, the sequence storing and segmenting means are constituted by a buffer BUF and the sequence shifting means include Nt circularly shiftable registers SRG0 ... SRGNt−1 respectively intended to store in parallel segments Psg0 ... PsgNt−1 simultaneously produced by said buffer BUF. The contents of one of these registers, in this example SRG0, will remain unchanged, while the contents of each jth other register SRGj (for j=1 to 3) will be submitted to a circular shift of j.M bits.

In this specific embodiment of the invention, the bit interleaving means INTL further include multiplexing means MX intended to receive all shifted segments Ssg0 ... SsgNt−1 delivered by the segment shifting means SRG0 ... SRGNt−1 and to multiplex said segments in order to form the stream of permutated bits Pb intended to be fed to the mapping and modulation module described in the previous Figure.

In alternative embodiments of the invention, the segments Ssg0 ... SsgNt−1 may be sent in parallel to multiple antenna-specific mapping and modulation modules before their transmission by the respective antennas associated with said modules.

FIG. 3 illustrates the operation of the bit interleaving means described above:

During a bit demultiplexing sub-step DMXS, a plurality of bit sequences of which only bit sequence Bs0 is shown here, is extracted from the stream of encoded data bits Pb. The bits intended to form bit sequence Bs0 are shown in white on this drawing, other bits intended to form part of three other sequences corresponding each to another one of the transmitting antennas being shown in a three different shades of grey.

The bits included in the stream of encoded data bits Pb are referenced 1, 2, 3, 4, 5, 6, 7, 8, 9 ... Lc.M.Nt, where Lc is the number of symbol periods required for transmitting a codeword, M is the number of bits forming a component of each symbol to be transmitted, and Nt is the number of transmitting antennas, which is equal to 4 in this example. Each bit sequence Bsj (for j=0 to Nt) thus includes Lc.M bits referenced 1+j, 5+j, 9+j, 13+j, 17+j ... Lc.M.Nt−(3−j).

During a sequence interleaving sub-step SRIS, the Lc.M bits of each bit sequence Bsj produced by the demultiplexing sub-step DMXS are then permutated, only the permutation of bit sequence Bs0 resulting in a permutated bit sequence Isq0 being shown here.

In the example depicted here, the sequence interleaving sub-step SRIS is carried out in such a way that Li successive encoded bits 1, 5, 9, 13, 17, etc. end up included in Li different segments of length M.Nt after execution of the sequence interleaving sub-step SRIS.

During a sequence storing and segmenting sub-step SQSS each permutated sequence Isqj (for j=0 to Nt−1) produced by the sequence interleaving sub-step SRIS is then memorized in a buffer and divided into successive segments having each a predermined length equal to Nt.M=4.M in this example.

During a segment shifting sub-step SGS, circular shifts of j.M bits are then simultaneously applied in parallel to Nt different segments Psgj (for j=0 to Nt−1) belonging each to one of the permutated sequences Isqj produced by the interleaving sub-step SRIS, so that each resulting shifted segment Ssgj ends up shifted by at least M bits with respect to all other shifted segments. In this embodiment of the invention, each of the successive segments Psg0 belonging to the permutated sequence Isq0 produced by the interleaving sub-step SRIS will remain unchanged during each sequence shifting sub-step SRGS, each segment Psgj belonging to a jth other permutated sequence Isqj (for j=1 to 3) being then shifted by j.M bits, M being equal to 2 in this example.

As can be seen in this Figure, the demultiplexing sub-step DMXS carried out in the method according to the invention enables an essentially homogeneous distribution of the encoded data bits over the different transmitting antennas, which ensures that successive bits, for example the bits referenced 25, 26, 27 and 28, will be transmitted over different channels, and thus favours data diversity as perceived at the receiver end of a telecommunication system in which a method according to the invention is used. Furthermore, the shifting sub-step SRGS carried out in the method according to the invention enables to place consecutive encoded bits, for example the bits referenced 25, 26, 27 and 28, over different symbol periods, St1, St2, St3 and St4, respectively. In a situation where physical properties of the communication channels between the transmitting and the receving antennas are ergodic, i.e. expected to vary from one symbol period to another, such consecutive encoded bits will thus see a maximum number of different channel states.

In an opposite situation where physical properties of the communication channels between the transmitting and the receiving antennas are essentially invariant, the fact that consecutive encoded bits are placed over different symbol periods by virtue of the invention prevents such consecutive bits to interfere with each other within the communication channels and thus also favours data diversity.

The sequence interleaving sub-step SRIS additionally enables optimal de-correlation of successive uncoded bits, which might otherwise stay linked together in cases where the bit encoding technique makes use of a convolutional code, according to which technique a same uncoded information bit is involved in the generation of L.n successive encoded bits, n being the number of encoded bits delivered by a convolutional channel encoder when said encoder is fed with a given number k of successive uncoded bits and L being the code constraint length. The inventors have observed that the use of such a variant of the invention may enable an essentially homogeneous distribution on all transmitting antennas and a mapping on different symbol periods of (Li−1).Nt+1 consecutive encoded bits if each segment has a length equal to M.Nt, the number (Li−1).Nt+1 being greater than or equal to L.n provided Li is properly chosen.

Figure 4:
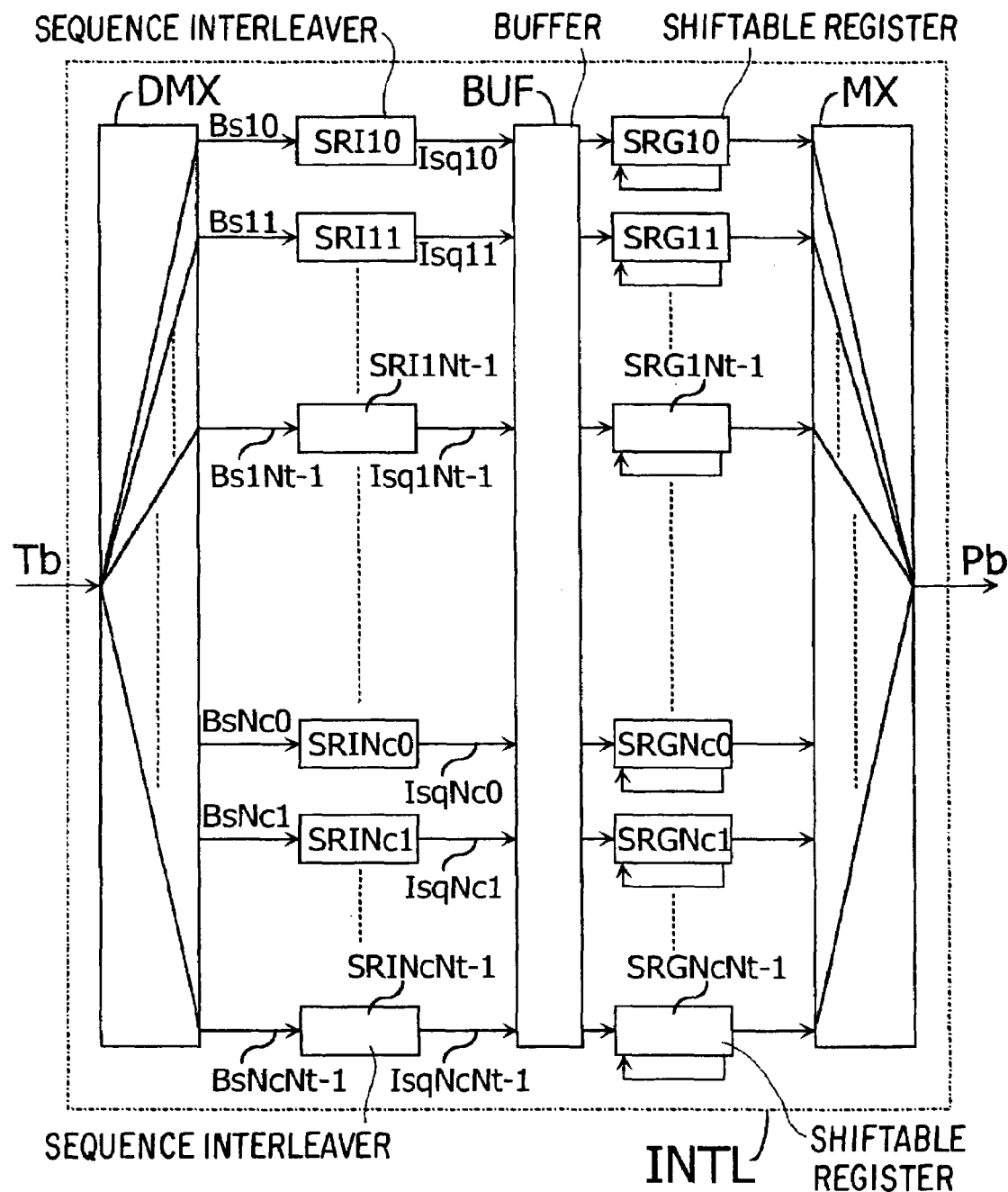
FIG. 4 is a block diagram showing an interleaver comprised in a transmitter included in a MIMO telecommunication system according to a second variant of the invention.

FIG. 4 represents interleaving means INTL according to a second variant of the invention, which second variant is particularly well-suited to situations where the communication channels are expected to feature Nc successive sets of physical properties during Lc successive symbol periods.

Such interleaving means RNTL have a similar structure to those according to the first variant of the invention described above. However, according to the second variant the bit demultiplexing means DMX are intended to produce Nt.Nc different bit sequences Bsij (for i=1 to Nc and j=0 to Nt−1), each sequence being intended to be transmitted by one transmitting antenna over Lc/Nc symbol periods, which will be ensured in this embodiment of the invention by the multiplexing means Mx coupled to a mapping and modulation module (not shown).

The structure of FIG. 2 is thus duplicated Nc times in the interleaving means INTL according to this second variant of the invention, which then include a parallel array of Nc.Nt interleaving modules SRij (for i=1 to Nc and j=0 to Nt−1), each intended to produce a permutated bit sequence Isqij, all sequences being intended to be memorized and divided into segments having each a predermined length M.Nt.Nc by the storing and segmenting means BUF, which segments are intended to be circularly shifted by segment shifting means SRGij.

Communication channels which are expected to successively feature Nc different sets of communication conditions over Lc successive symbol periods are called block-fading channels. Such block-fading channels are essentially invariant for the duration of each set of communication conditions, which duration may thus be called an invariance period lasting Lc/Nc symbol periods. Thanks to this second variant of the invention, each given sequence will be sent over a given transmitting antenna during time slots which will be specific to said given sequence. This ensures that consecutive encoded bits will see a maximum number of different channel states and thus favours data diversity.

The invention claimed is:

1. A method for transmitting data in a telecommunication system including at least one transmitter provided with Nt transmitting antennas and at least one receiver provided with at least one receiving antenna, which method includes a bit encoding step for generating encoded data bits, a bit interleaving step for permutating said encoded data bits, and a modulation step for producing symbols representative of the permutated bits, each symbol featuring a plurality of components of M bits each, and being intended to be transmitted over communication channels established between the transmitting and receiving antennas, the method characterized in that the bit interleaving step includes a bit demultiplexing sub-step for extracting from the encoded data bits a plurality of bit sequences, each sequence being intended to be transmitted by one of the transmitting antennas, a sequence interleaving sub-step for permutating the bits of each bit sequence produced by the demultiplexing sub-step, a sequence storing and segmenting sub-step for memorizing all the permutated sequences produced by the sequence interleaving sub-step and dividing said sequences into segments having each a predetermined length, and a segment shifting sub-step for simultaneously applying circular shifts to the segments of different ones of the permutated sequences produced by the sequence storing and segmenting sub-step, so that each shifted segment ends up shifted by at least M bits with respect to all other simultaneously shifted segments.

2. The method as claimed in claim 1, characterized in that the bit demultiplexing sub-step is intended to produce Nt different bit sequences, each sequence being intended to be transmitted by one of the transmitting antennas over Lc symbol periods.

3. The method as claimed in claim 1, characterized in that, the communication channels being expected to feature Nc successive sets of physical properties during Lc successive symbol periods, the bit demultiplexing sub-step is intended to produce Nt.Nc different bit sequences, each sequence being intended to be transmitted by one of the transmitting antennas over Lc/Nc symbol periods.

4. The method as claimed in any one of claims 1 to 3, characterized in that one of the segments of a given permutated sequence produced by the interleaving sub-step remains unchanged during the segment shifting sub-step, corresponding segments of each jth other permutated sequence being then simultaneously shifted by j.M bits.

5. The method as claimed in claim 4, characterized in that the sequence interleaving sub-step is carried out in such a way that Li successive encoded bits end up included in Li different segments after execution of the sequence interleaving sub-step.

6. A telecommunication system including at least one transmitter provided with a plurality of transmitting antennas and at least one receiver provided with at least one receiving antenna, which transmitter includes bit encoding means for generating encoded data bits, bit interleaving means for permutating said encoded data bits, and modulation means for producing symbols representative of the permutated bits, each symbol featuring a plurality of components of M bits each, and being intended to be transmitted over communication channels established between the transmitting and receiving antennas, The system characterized in that the bit interleaving means include bit demultiplexing means for extracting from the encoded data bits a plurality of bit sequences, each sequence being intended to be transmitted by one of the transmitting antennas, sequence interleaving means for permutating the bits of each bit sequence produced by the demultiplexing means, sequence storing and segmenting means for memorizing all permutated sequences produced by the sequence interleaving means and dividing said sequences into segments having each a predetermined length, and segment shifting means for simultaneously applying circular shifts to the segments of different ones of the permutated sequences produced by the sequence storing and segmenting means, so that each shifted segment ends up shifted by at least M bits with respect to all other simultaneously shifted segments.

7. The telecommunication system as claimed in claim 6, characterized in that the bit demultiplexing means are intended to produce Nt different bit sequences, each sequence being intended to be transmitted by one of the transmitting antennas over Lc symbol periods.

8. The telecommunication system as claimed in claim 6, characterized in that, the communication channels being expected to feature Nc successive sets of physical properties during Lc successive symbol periods, the bit demultiplexing means are intended to produce Nt.Nc different bit sequences, each sequence being intended to be transmitted by one of the transmitting antennas over Lc/Nc symbol periods.

9. The telecommunication system as claimed in any one of claims 6 to 8, characterized in that the segment shifting means are intended to leave one of the segments of a given permutated sequences produced by the interleaving sub-step unchanged, while simultaneously applying to corresponding segments of each jth other permutated sequence a circular shift of j.M bits.

10. The telecommunication system as claimed in claim 9, characterized in that the sequence interleaving means include at least one interleaver intended to dispatch Li successive encoded bits into Li different segments delivered by said sequence interleaving means.

11. A communication device provided with a plurality of transmitting antennas, the communication device including bit encoding means for generating encoded data bits, bit interleaving means for permutating said encoded data bits, and modulation means for producing symbols representative of the permutated bits, each symbol featuring a plurality of components of M bits each, and being intended to be transmitted over communication channels established between the transmitting and receiving antennas, the device characterized in that the bit interleaving means include bit demultiplexing means for extracting from the encoded data bits a plurality of bit sequences, each sequence corresponding to one of the transmitting antennas, sequence interleaving means for permutating the bits of each bit sequence produced by the demultiplexing means, and sequence storing and segmenting means for memorizing all permutated sequences produced by the sequence interleaving means and dividing said sequences into segments having each a predetermined length, and segment shifting means for simultaneously applying circular shifts to the segments of different ones of the permutated sequences produced by the sequence storing and segmenting means, so that each shifted segment ends up shifted by at least M bits with respect to all other simultaneously shifted segments.

* * * * *